US007702873B2

(12) United States Patent
Griess et al.

(10) Patent No.: US 7,702,873 B2
(45) Date of Patent: Apr. 20, 2010

(54) MANAGING COMMON STORAGE BY ALLOWING DELAYED ALLOCATION OF STORAGE AFTER RECLAIMING RECLAIMABLE SPACE IN A LOGICAL VOLUME

(75) Inventors: Peter Griess, San Francisco, CA (US); David A. Grunwald, Santa Clara, CA (US); Jason A. Lango, Mountain View, CA (US); Qinghua Zheng, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 268 days.

(21) Appl. No.: 11/114,518

(22) Filed: Apr. 25, 2005

(65) Prior Publication Data
US 2006/0242382 A1    Oct. 26, 2006

(51) Int. Cl.
G06F 12/00 (2006.01)
G06F 13/00 (2006.01)
G06F 13/28 (2006.01)
G06F 17/30 (2006.01)

(52) U.S. Cl. .............. 711/170; 711/100; 711/133; 711/147; 711/148; 711/173; 711/111; 711/112; 707/206; 707/205

(58) Field of Classification Search .............. 711/170, 711/171, 172; 707/205, 206
See application file for complete search history.

(56) References Cited

U.S. PATENT DOCUMENTS 5,457,793 A * 10/1995 Elko et al. ............ 707/205
5,461,712 A * 10/1995 Chelstowski et al. ...... 345/543
5,560,003 A * 9/1996 Nilsen et al. ............ 707/206
5,606,689 A * 2/1997 Nakagawa ............. 707/206
5,634,096 A    5/1997 Baylor et al.
6,983,303 B2   1/2006 Pellegrino et al.
7,028,158 B1 * 4/2006 Beatty et al. ............ 711/202
7,089,395 B2   8/2006 Jacobson et al.
7,149,866 B2 * 12/2006 Blandy ................. 711/170
2002/0056019 A1 * 5/2002 Kolodner et al. ........... 711/6

(Continued)

OTHER PUBLICATIONS

David A. Patterson, "A Case for Redundant Arrays of Inexpensive Disks (RAID)," 1998, USC-Berkeley Dept. of Computer Science, p. 110.*

(Continued)

*Primary Examiner*—Sanjiv Shah
*Assistant Examiner*—Marwan Ayash
(74) *Attorney, Agent, or Firm*—Blakely, Sokoloff, Taylor & Zafman LLP (57) ABSTRACT

An apparatus and method for managing of common storage in a storage system is disclosed. In one embodiment, a storage system receives a request to set a space reservation for a volume associated with a logical aggregation of physical storage. In response, the storage system sets the space reservation to indicate that the logical aggregation of physical storage is to provide a specified amount of space to the volume. In one embodiment, space within the logical aggregation of physical storage is automatically reclaimed to set a delayed space reservation if the amount of unused space within the logical aggregation of physical storage is insufficient to set the space reservation. In one embodiment, the volume is either a space-reclaimable volume or a non-space-reclaimable volume. Other embodiments are described and claimed.

20 Claims, 9 Drawing Sheets

U.S. PATENT DOCUMENTS

2002/0199059 A1* 12/2002 Riedle et al. ................ 711/114
2003/0050729 A1* 3/2003 Basham et al. .............. 700/214
2003/0126132 A1 7/2003 Kavuri et al.
2004/0044827 A1* 3/2004 Carlson et al. ................. 711/4

OTHER PUBLICATIONS

Ruth Baylis, "Oracle Database Administrator's Guide," Dec. 2003, Oracle Corporation, 10.1 Release, Table 13-5.*

* cited by examiner

MANAGING COMMON STORAGE BY ALLOWING DELAYED ALLOCATION OF STORAGE AFTER RECLAIMING RECLAIMABLE SPACE IN A LOGICAL VOLUME

RELATED APPLICATION

This utility patent application is related to currently pending U.S. application Ser. No. 11/101,909, filed on Apr. 8, 2005, entitled CAPACITY GUARANTEES IN A STORAGE SYSTEM.

FIELD OF THE INVENTION

At least one embodiment of the present invention pertains to storage systems, and more particularly, to a method and apparatus for managing of common storage in a storage system.

BACKGROUND

A storage server is a special-purpose processing system used to store and retrieve data on behalf of one or more client processing systems ("clients"). A storage server can be used for many different purposes, such as, to provide multiple users with access to shared data or to backup mission critical data.

A file server is an example of a storage server. A file server operates on behalf of one or more clients to store and manage shared files in a set of mass storage devices, such as magnetic or optical storage based disks or tapes. The mass storage devices may be organized into one or more volumes of Redundant Array of Inexpensive Disks (RAID). Another example of a storage server is a device which provides clients with block-level access to stored data, rather than file-level access, or a device which provides clients with both file-level access and block-level access.

In conventional file servers, there is a fixed relationship between a volume and the disks that are associated with the volume. This fixed relationship means that each volume has full control over the disks that are associated with the volume. For example, only the volume associated with the disk can read and/or write to the disk. Unused space within the disks associated with the volume cannot be used by another volume. Thus, even if a volume is only using a fraction of the space on its associated disks, the unused space is reserved for the exclusive use of the volume.

Another feature of the fixed relationship between a volume and its associated disks, in conventional file servers, is that the size of the volume is equal to the capacity of the associated disks. This means that the size of the underlying physical storage dictates the size of the volume. If a user wants to increase the size of the conventional volume, she must add disks to the physical storage (e.g., add a RAID group). Similarly, if the user wants to decrease the size of the conventional volume, she must remove disks from the physical storage.

SUMMARY OF THE INVENTION

Embodiments of the invention are generally directed to a system and method for managing common storage in a storage system. In one embodiment, a storage server receives a request to set a space reservation for a volume associated with a logical aggregation of physical storage. In response, the storage server sets the space reservation to indicate that the logical aggregation of physical storage is to provide a specified amount of space to the volume. In one embodiment, the volume is either a space-reclaimable volume or a non-space-reclaimable volume. In one embodiment, space within the logical aggregation of physical storage is automatically reclaimed to set a delayed space reservation if the amount of unused space within the logical aggregation of physical storage is insufficient to set the space reservation. Other embodiments are described and claimed.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

A method and apparatus for managing of common storage in a storage system are described. As described in greater detail below, in certain embodiments the managing of common storage includes setting a delayed space reservation for a volume that operates as either a space-reclaimable volume or a non-space-reclaimable volume that is associated with a logical aggregation of physical storage. A "non-space-reclaimable volume" may refer to a logical container of data that can be sized, resized, managed, and moved independently from the underlying physical storage. A "space-reclaimable volume" may refer to a logical container of data that can be sized, resized, managed, and moved independently from the underlying physical storage and configured to enable the reclaiming of space within the volume.

The "logical aggregation of physical storage" may refer to an entity that provides the connection between one or more space-reclaimable volumes, one or more non-space-reclaimable volumes and the underlying physical storage. For ease of description, the term "aggregate" is sometimes used when describing the "logical aggregation of physical storage." As described herein, the space-reclaimable volumes may include, but are not limited to caching volumes, which may be used for temporary storage of client data, storage volumes configured to enable compression of data contained therein, storage volumes configured to offload data onto another volume or aggregate, and the like.

Figure 1:
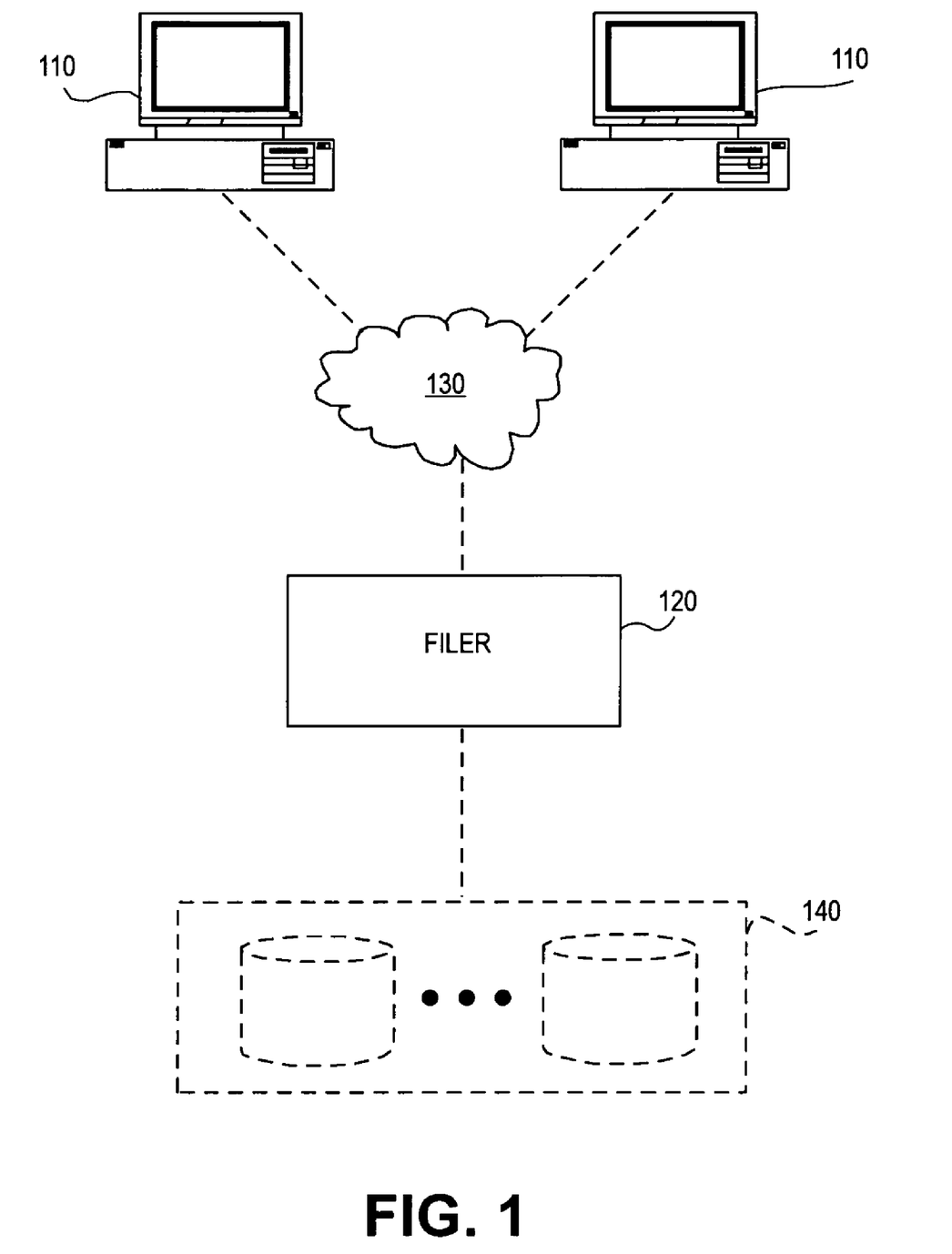
FIG. 1 shows a network environment that includes a storage server which implements the invention.

As noted above, the techniques for managing of common storage introduced herein can be implemented in a storage server. FIG. 1 shows a simple example of a network environment which incorporates a storage server 120. Note, however, that the techniques for managing of common storage introduced herein are not limited to use in traditional storage servers. For example, the technique can be adapted for use in other types of storage systems, such as file servers that operate on behalf of one or more clients to store and manage shared files in a set of mass storage devices, such as magnetic or optical storage based disks or tapes, storage systems that provide clients with block-level access to stored data, storage systems that provide access to stored data, or the like.

System Architecture

Storage server 120 is coupled locally to a storage subsystem 140 which includes a set of mass storage devices, and to a set of clients 110 through a network 130, such as a local area network (LAN). Each of the clients 110 may be, for example, a conventional personal computer (PC), workstation, or the like. Storage subsystem 140 is managed by storage server 120. For example, storage server 120 receives and responds to various read and write requests from the clients 110, directed to data stored in or to be stored in storage subsystem 140. The mass storage devices in storage subsystem 140 may be, for example, conventional magnetic disks, optical disks such as compact disks-read only memory (CD-ROM) or digital versatile/video disks (DVD) based storage, magneto-optical (MO) storage, or any other type of non-volatile storage devices suitable for storing large quantities of data.

Storage server 120 may have a distributed architecture; for example, it may include a separate N-("network") blade and D-(disk) blade (not shown). In such an embodiment, the N-blade is used to communicate with clients 110, while the D-blade includes the file system functionality and is used to communicate with the storage subsystem 140. The N-blade and D-blade communicate with each other using an internal protocol. Alternatively, storage server 120 may have an integrated architecture, where the network and data components are all contained in a single box. The storage server 120 further may be coupled through a switching fabric to other similar storage servers (not shown) which have their own local storage subsystems. In this way, all of the storage subsystems can form a single storage pool, to which any client of any of the storage servers has access.

Figure 2:
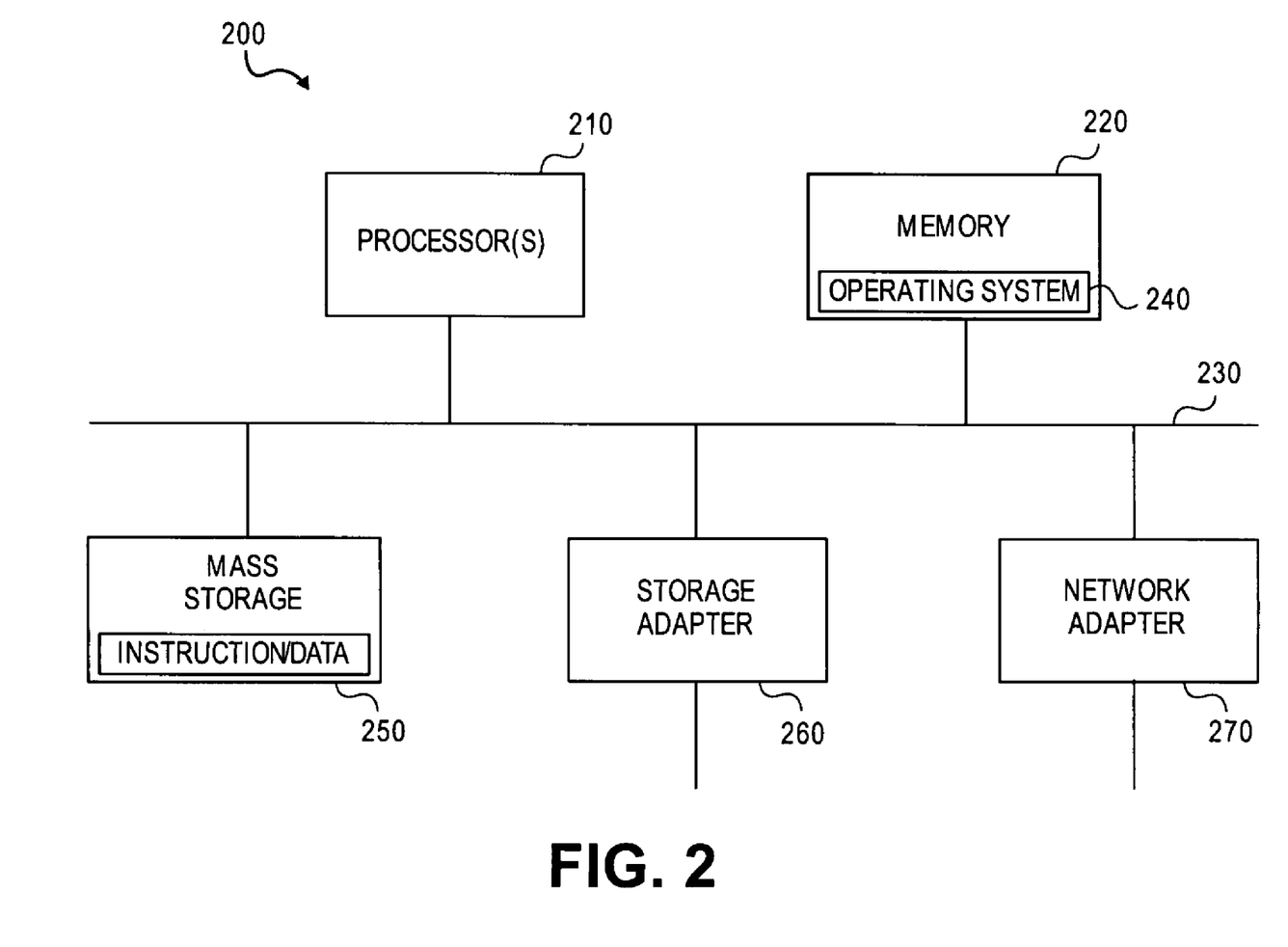
FIG. 2 is a block diagram showing the architecture of a storage server that can implement one embodiment of the invention.

FIG. 2 is a block diagram showing the architecture of storage server 120, according to certain embodiments of the invention. Certain standard and well-known components which are not germane to the present invention may not be shown. Storage server 120 includes one or more processors 210 and memory 220 coupled to a system interconnect 230. System interconnect 230 shown in FIG. 2 is an abstraction that represents any one or more separate physical buses and/or point-to-point connections, connected by appropriate bridges, adapters and/or controllers. System interconnect 230, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

Processors 210 are the central processing units (CPUs) of a storage server (e.g., file sever 120, shown in FIG. 1) and, thus, control the overall operation of the storage server. In certain embodiments, processors 210 accomplish this by executing software stored in memory 220. Processor 210 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 220 is or includes the main memory of storage server 120. Memory 220 represents any form of random access memory (RAM), read-only memory (ROM), flash memory, or the like, or a combination of such devices. Memory 220 stores, among other things, operating system 240 of storage server 120, in which the capacity guarantee techniques introduced above can be implemented.

Also connected to processors 210 through the system interconnect 230 are one or more internal mass storage devices 250, a storage adapter 260, and a network adapter 270. Internal mass storage devices 250 may be or include any conventional medium for storing large volumes of data in a non-volatile manner, such as one or more magnetic or optical based disks. The storage adapter 260 allows storage server 120 to access storage subsystem 140 (shown in FIG. 1) and may be, for example, a Fibre Channel adapter or a Small Computer System Interface (SCSI) adapter. Network adapter 270 provides storage server 120 with the ability to communicate with remote devices, such as the clients 110 (shown in FIG. 1), over a network and may be, for example, an Ethernet adapter.

Figure 3:
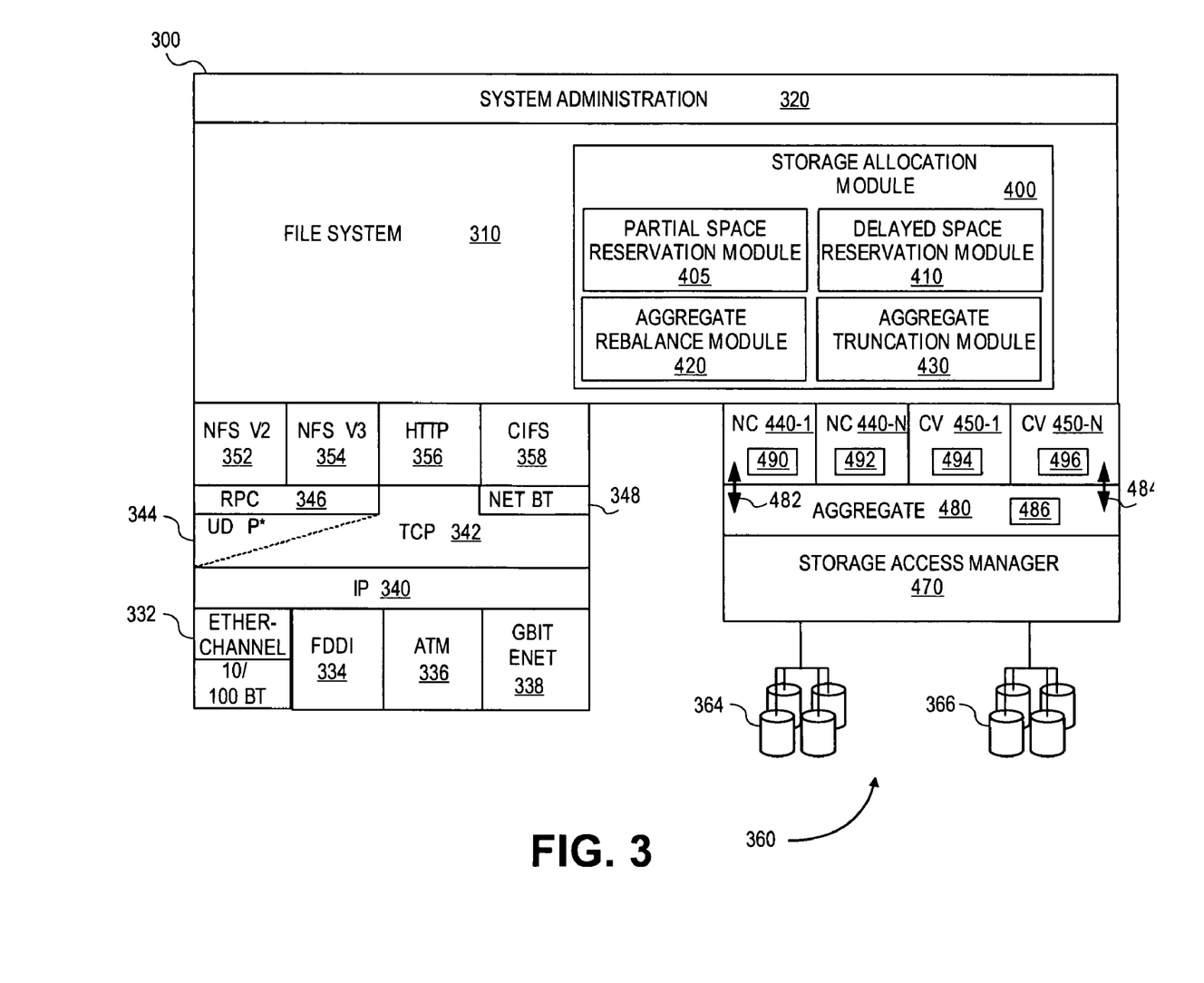
FIG. 3 is a block diagram illustrating selected aspects of the logical architecture of a storage system, according to an embodiment of the invention.

FIG. 3 is a block diagram illustrating selected aspects of the logical architecture of a storage system (e.g., its operating system), according to one embodiment. In one embodiment, operating system 300 includes a collection of coupled processing modules to handle client requests (e.g., requests from clients 110, shown in FIG. 1). A request starts in the network drivers at the lower left, and moves up through the network protocol layers and the file system, eventually generating disk input/output (I/O) if necessary. When file system 310 finishes the request, it sends a reply back to the network. System administration layer 320 monitors and controls the modules below. In addition to the modules shown in FIG. 3, a simple real-time kernel may provide basic services such as process creation, memory allocation, message passing, and interrupt handling. In an alternative embodiment, operating system 300 may include more modules, fewer modules, and/or different modules.

In one embodiment, operating system 300 includes a number of network drivers to process client requests. The illustrated embodiment includes Ether-channel driver 332, Fiber Distributed Data Interface (FDDI) driver 334, Asynchronous Transfer Mode (ATM) driver 336, and gigabit Ethernet driver 338. In an alternative embodiment, operating system 300 may include more network drivers, fewer network drivers, and/or different network drivers.

Operating system 300 includes an implementation of Internet Protocols (IP) 340. In an embodiment, operating system 300 includes implementations of both Transmission Control Protocol (TCP) 342 and User Datagram Protocol (UDP) 344. In addition, the network layer may include implementations of Remote Procedure Call (RPC) 346 and NetBIOS over TCP/IP 348. Operating system 300 may also implement one or more of various higher-level network protocols, such as Network File System (NFS) 352, 354, Common Internet File System (CIFS) 358, and/or Hypertext Transfer Protocol (HTTP) 356.

File system 310 is application-layer software that manages the directory structure (e.g., the hierarchical structure) of the data stored in storage subsystem 360. For example, file system 310 manages read/write operations on the data stored in storage subsystem 360 (e.g., executes read/write operations on the disks in response to client requests). In one embodiment, file system 310 includes storage allocation module 400. In an alternative embodiment, storage allocation module 400 is implemented in a different layer of operating system 300 and/or is distributed across more than one layer (and/or more than one module) of operating system 300. As is further described below, with reference to FIGS. 5-9, storage allocation module 400 provides logic to determine allocation and reallocation of the common pool of storage provided by aggregate 480.

Operating system 300 includes non-space-reclaimable volumes 440 (440-1, . . . , 440-N), space-reclaimable volumes 450 (450-1, . . . , 450-N) and aggregate 480. In one embodiment, non-space-reclaimable volumes 440 and space-reclaimable volumes 450 are logical data containers that can be sized, resized, managed, and moved independently from the underlying physical storage. In the embodiment illustrated in FIG. 3, non-space-reclaimable volumes 440 are shown as non-caching volumes (NC) 440 that provide persistent storage of client data, whereas space-reclaimable volumes 450 are shown as caching volumes (CV) 450 that provide temporary storage of client data.

In an alternative embodiment, a non-caching volume is a space-reclaimable volume that may include, but is not limited to a storage volume configured to enable compression of data contained therein, a storage volume configured to offload data onto another volume or aggregate, and the like. As described herein, space-reclaimable volumes and non-space-reclaimable volumes may be collectively referred to herein as "Volumes." Volumes 440/450 decouple what was, in conventional volumes, a direct connection between volumes and their associated physical disks. This decoupling of volumes and physical disks vastly increases the flexibility and storage efficiency of operating system 300.

In contrast to conventional systems, the underlying storage for a Volume is no longer directly provided by disks. Instead, Volumes 440/450 obtain storage from aggregate 480. The storage for aggregate 480, in turn, is provided by storage subsystem 360. Accordingly, caching volumes 450 share the same underlying storage pool (aggregate 480) with non-caching volumes 440. In one embodiment, to provide good caching performance and behavior while not impacting non-caching volumes 440, storage allocation in the caching volumes 450 is monitored and adjusted continuously by storage allocation module 400. As described in further detail, storage allocation module 400 ensures that storage is allocated fairly between all caching volumes (using, for example, heuristics client access patterns, disk usage and the like), between non-space-reclaimable and space-reclaimable volumes (using partial volume space reservations), and within a single caching volume between cache data and metadata.

Figure 4:
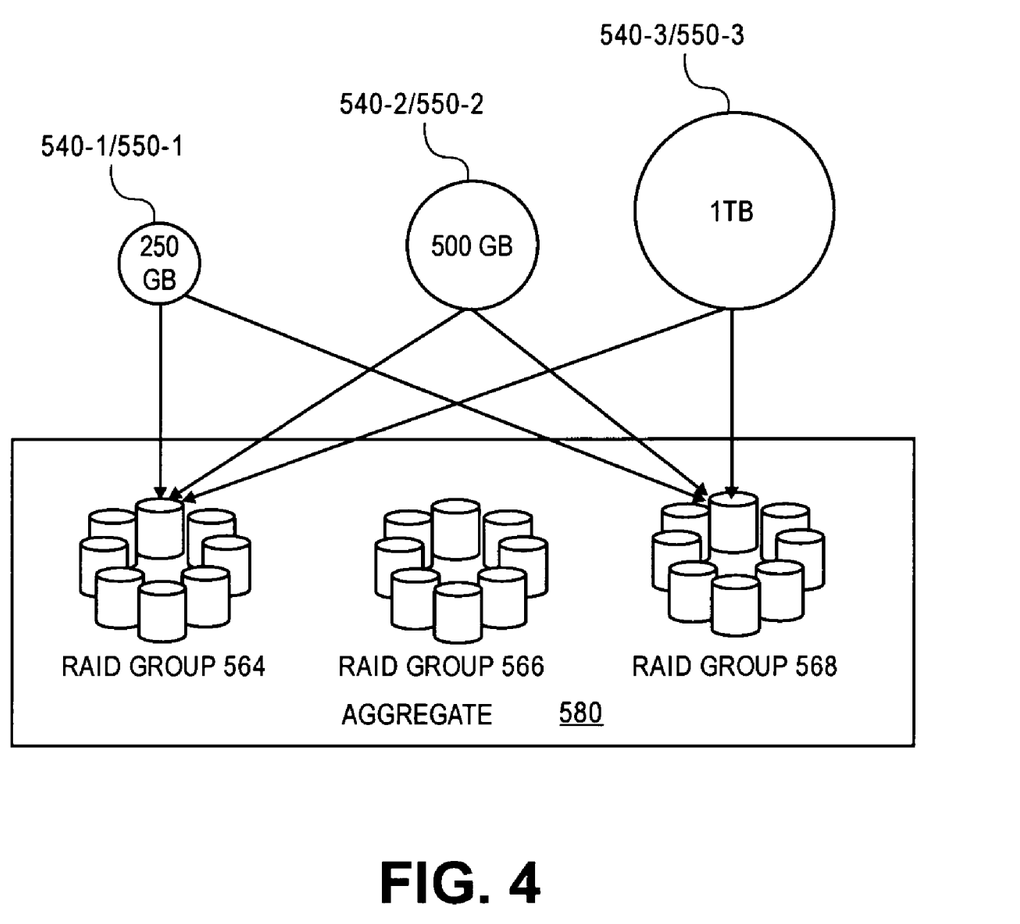
FIG. 4 is a block diagram illustrating selected relationships between a number of non-space-reclaimable volumes, a number of space-reclaimable volumes and an aggregate, according to an embodiment of the invention.

FIG. 4 is a block diagram illustrating selected relationships between Volumes 540-1/550-1-540-3/550-3 and aggregate 580, according to one embodiment. Aggregate 580 provides a common pool of physical storage to Volumes 540-1/550-1-540-3/550-3. In the illustrated embodiment, aggregate 580 includes RAID groups, 564-568. The aggregate 580 is not, however, limited to RAID groups. Instead, it can include any storage technology suitable for mass storage. The arrows connecting Volumes 540-1/550-1-540-3/550-3 to aggregate 580 illustrate that each Volume may store data in any or all of RAID groups 564-568. The common pool of physical storage provided by aggregate 580 enables a more efficient storage architecture because unused disk space can be allocated to Volume.

In one embodiment, storage space can be allocated to a Volume without actually reserving space on the underlying physical storage. In such embodiments, "over-provisioning" of a Volume is possible. Over-provisioning refers to allocating more space to a Volume (or a set of Volumes) than is actually available in the physical storage. Using Volume 540-1/550-1 as an example, an additional 500 GB may be allocated to Volume 540-1/550-1 even if there are only 1.75 TBs of physical storage space available to aggregate 580.

The ability to overprovision storage space creates the possibility of having insufficient storage space in aggregate 580 to temporarily store (cache) client data. In some cases, it is preferable to ensure that there is sufficient space in aggregate 580 to provide adequate caching performance. Referring again to FIG. 3, in an embodiment, storage allocation module 400 provides a mechanism for ensuring that there is sufficient space in aggregate 480.

As shown in FIG. 3, in one embodiment, storage allocation module 400 provides space reservations (e.g., space reservations 482 and 484). A "space reservation" refers to a contract between a Volume and an aggregate in which the aggregate "agrees" to reserve (e.g., in the physical storage) a specified amount of space for the Volume. In other words, a space reservation guarantees a specified amount of space in physical storage for a Volume. As described below, managing of the common storage provided by aggregate 480 may detect a lack of sufficient space to set a space reservation. In one embodiment, managing the common storage provided by aggregate 480 may include automatically reclaiming of space within aggregate 480 to set a "delayed space reservation." As described herein, reclaiming of space may be performed without user knowledge or involvement.

As shown in FIG. 3, storage allocation module 400, in one embodiment, includes partial space reservation module 405, delayed space reservation module 410, aggregate rebalance module 420 and aggregate truncation model 430. In an alternative embodiment, storage allocation module 400 and/or partial space reservation module 405, delayed space reservation module 410, aggregate rebalance module 420 and aggregate truncation model 430 are implemented in a different layer of operating system 300 and are distributed across more than one layer (and/or more than one module) of operating system 300.

As described below, partial space reservation module 405 may ensure fair allocation of the storage pool provided by aggregate 480 between non-caching volumes 440 and caching volumes 450. In one embodiment, partial space reservation module 405 reserves a portion of space within aggregate 480 to the caching volumes 450, which is less than a capacity of the caching volumes 450, referred to herein as a "partial space reservation." However, the reservation of space within aggregate 480, in the form of a space reservation, may not be performed due to the lack of available space within aggregate 480. Accordingly, in one embodiment, delayed space reservation module 410 may identify an amount of space, which may be reclaimed from caching volumes 450, referred to herein as "space-reclaimable."

In an alternative embodiment, at least one non-caching volume 440 is configured as a space-reclaimable volume. As described herein, non-caching space-reclaimable volumes may include, but are not limited to, storage volumes configured to enable compression of data contained therein, storage volumes configured to offload data onto another volume or aggregate, and the like. In accordance with this embodiment, space-reclaimable, as described herein, includes an amount of space, which may be reclaimed from caching volumes 450, as well as an amount of space, which can be reclaimed from one or more space-reclaimable non-caching volumes.

In one embodiment, identification of space-reclaimable is followed by reclaiming of space. As described herein, "reclaiming of space" may include, but is not limited to, truncation of data contained with an identified space-reclaimable. In an alternative embodiment, or in addition to the above-described definition for reclaiming a space, reclaiming of space may include, but is not limited to, compression of data contained within a space-reclaimable volume, offloading of data onto another volume or aggregate, or other like techniques for generating space within a volume.

As described herein, truncation, or truncating, may refer to the removal of the blocks from the aggregate. As described herein, an "inofile" (inode file) is a file on disk that contains inodes. An inode is a chunk of metadata describing an individual file (its size, permissions, various timestamps, etc.). For purposes of this description, an inode is a data structure, stored in an inofile, that keeps track of which logical blocks of data in the storage subsystem are used to store each file. Normally, each stored file is represented by a corresponding inode. A data block can be referenced directly by an inode, or commonly, however, a particular data block is referenced by an inode indirectly, rather than directly.

In one embodiment, truncation is performed by selecting a target inofile file block number (FBN). In a non-space-reclaimable volume, inodes are indispensable since they describe the contents of your volume. However, on a caching volume, an inode may be removed if the file which the inode describes is removed; caching volumes provide temporary storage of client data, therefore, any object removed from a caching volume may be re-fetched from the origin server. Hence, in the embodiments described, truncation is limited to caching volumes.

In accordance with one embodiment, once a target inofile block is selected, inodes contained within the selected block inofile are released and the file block number (FBN) is marked as a "hole." Selecting a suitable target block may be performed in a linear fashion through the inofile. As described herein, metadata describing an individual file, which is truncated from a storage volume, may not be reclaimable. Accordingly, such metadata, as described herein, is referred to as "non-reclaimable metadata."

Figure 7:
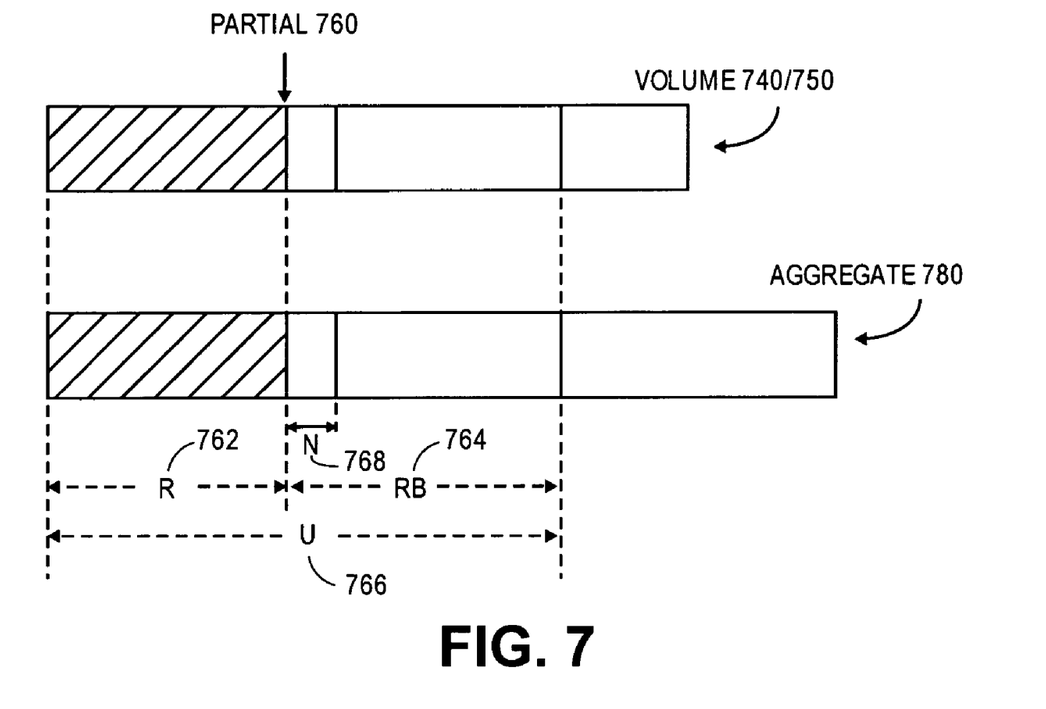
FIG. 7 is a block diagram illustrating space-reclaimable within an aggregate according to an embodiment of the invention.

In one embodiment, reclaiming of space is limited to space-reclaimable volumes, including caching volumes 450, since space-reclaimable volumes are configured to enable reclaiming of space. In an alternative embodiment, non-caching volumes, which used for persistent storage of client data, are also space-reclaimable volumes. In one embodiment, delayed space reservation module 410 determines an amount of space-reclaimable allocated to caching volumes 450 and, optionally, space-reclaimable from one or more space-reclaimable non-caching volumes 440, as shown in FIG. 7. In one embodiment, delayed space reservation module 410 determines, for the Volume requesting a space reservation, whether the volume is enabled for a delayed space reservation and if so, delays setting of a space reservation for the volume until space is reclaimed from the space-reclaimable volumes 450.

As part of managing the common pool of storage provided by aggregate 480 between Volumes 440/450, in one embodiment, aggregate rebalance module 420 determines whether one or more caching volumes 450 are using more than their fair share of aggregate 480. In one embodiment, when one or more caching volumes 450 are using more than their fair share, which is prohibiting a separate caching volume from caching data within aggregate 480, aggregate rebalance module 420 reclaims space utilized by the one or more caching volumes. The reclaimed space may subsequently be allocated to the separate caching volume to enable additional caching of data.

In one embodiment, as part of this reclaiming process, aggregate truncation module 430 is responsible for reclaiming space within aggregate 480, which is allocated to both space-reclaimable and non-space-reclaimable volumes, and converts the space into a free space reserve. In one embodiment, the free space reserve is used to enable aggregate rebalancing module 420, as well as delayed space reservation module 410. In one embodiment, aggregate truncation module 430 may also truncate metadata in favor of client data stored within a caching volume 450.

In one embodiment, operating system 300 maintains one or more data structures to support space reservation, which may or may not require a delayed space reservation while space is reclaimed within aggregate 480. In some embodiments, these data structures are counters while in alternative embodiments different and/or additional data structures may be used. In one embodiment, two levels of counters are used: the aggregate level (e.g., counter 486); and the volume level (e.g., counters 490-496). The aggregate level counter 486 maintains data for aggregate 480 and volume level counters 490-496 maintain data for Volumes 440/450, respectively.

In one embodiment, each volume level counter 490-496 maintains both a count of space within the aggregate that is used by the respective a Volume (e.g., a U counter), a count of reserved space that is reserved for the Volume used (e.g., an R counter) and a count of non-reclaimable metadata blocks (e.g., an N counter). The aggregate level counter 486 maintains, for example, the sum of all of the space within the aggregate that is used by Volumes 440/450 and the sum of all of the space reserved in the aggregate for Volumes 440/450. In addition, the size of aggregate 480 and/or the sizes of Volumes 440/450 may be maintained by one or more data structures within operating system 300.

Counters 486-496 (and/or other comparable data structures) allow storage allocation module 400 to set and resize space reservations, as well as reclaim space, for Volumes 440/450. In an embodiment, setting a space reservation (and/or resetting a space reservation) involves calculating the space required from aggregate 480 to support the reservation and determining whether the required space is available in aggregate 480. Counters 490-496 allow, for example, storage allocation module 400 to calculate the space required from aggregate 480 to support the space reservation including an amount of space-reclaimable if a delayed space reservation is required. Similarly, counter 486 allows storage allocation module 400 to determine whether the required space is available in aggregate 480, including an amount of space-reclaimable if a delayed space reservation is required. Setting a delayed space reservation is further described below with reference to FIG. 5.

For purposes of explanation, counters 486-496 are shown within the structures with which they are associated. It is to appreciated, however, that counters 486-496 may be located almost anywhere within operating system 300. For example, in an embodiment, counters 486-496 are part of storage allocation module 400. In an alternative embodiment, the values discussed above with reference to counters 486-496 may be stored in persistent storage and accessed as needed. In such an embodiment, capacity guarantees are available both when a file system (e.g., files system 310) is online and when it is offline.

In an embodiment, the reserved space can be anywhere within the physical storage (e.g., anywhere in RAID groups 364 and 366). In such an embodiment, storage access manager 470 determines where within the physical storage data is written. Storage access manage 470 implements a higher-level disk storage protocol, such as RAID, while the storage driver layer (not shown) implements a lower-level storage device access protocol, such as Fibre Channel Protocol (FCP) or SCSI. Procedural methods for implementing embodiments of the invention are now described.

Operation

Figure 5:
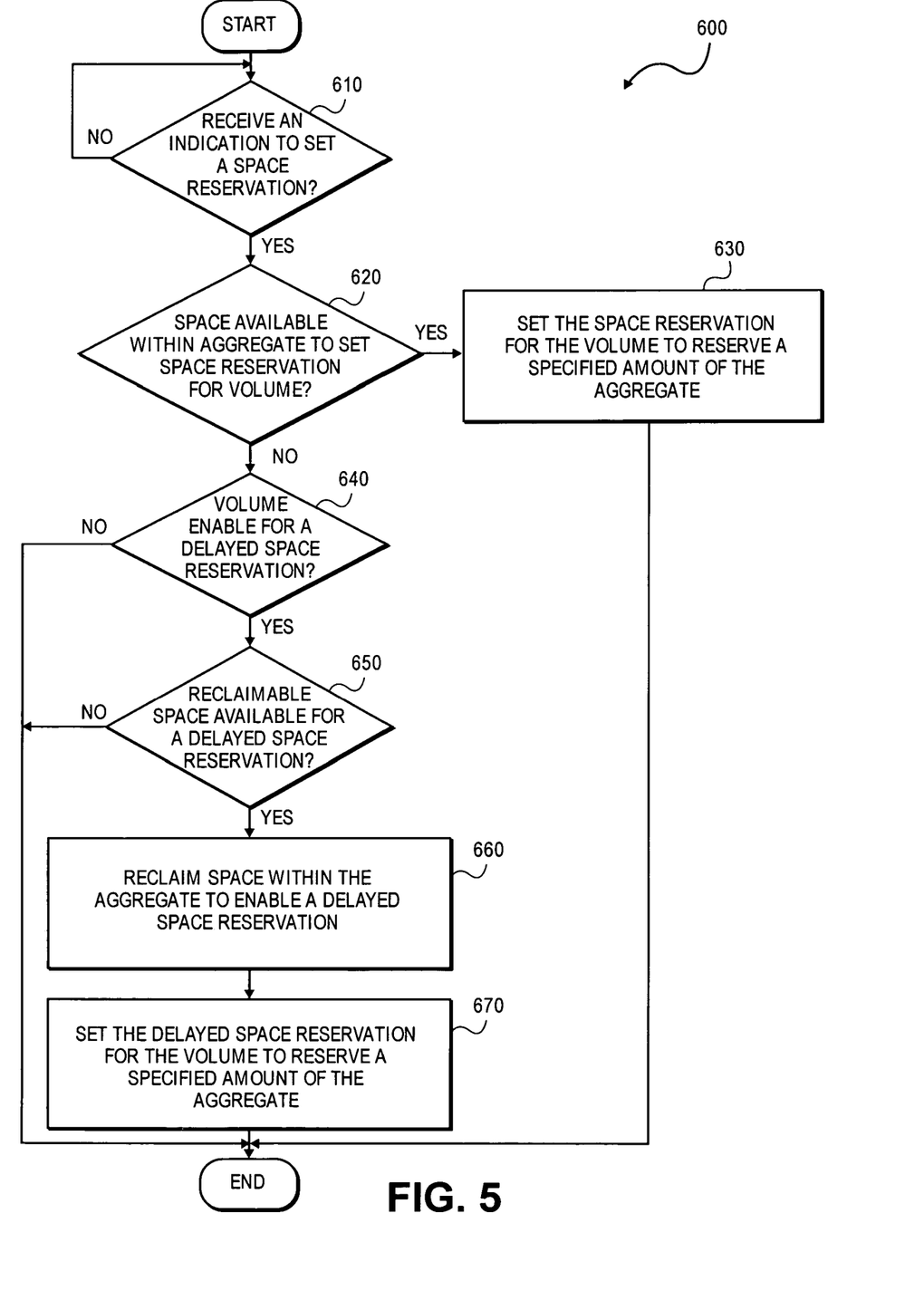
FIG. 5 is a flowchart illustrating a method for setting a delayed space reservation according to an embodiment of the invention.

Turning now to FIG. 5, the particular methods associated with embodiments of the invention are described in terms of computer software and hardware with reference to a flowchart. The methods to be performed by a computing device (e.g., a storage server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems.

In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 5 is a flowchart illustrating certain aspects of a method 600 for managing of common storage, according to an embodiment of the invention. Referring to process block 610, a system (e.g., operating system 300, shown in FIG. 3) receives an indication to set a space reservation for a Volume (space-reclaimable/non-space-reclaimable volume). In one embodiment, an aggregate (e.g., aggregate 480, shown in FIG. 3) provides an abstraction layer between the Volume and the underlying physical storage (e.g., RAID groups 364-366, shown in FIG. 3). The term "abstraction layer" refers to providing a logical abstraction of the underlying physical storage to decouple what has conventionally been a direct relationship between volumes and physical storage.

The phrase "receiving an indication" refers to receiving an instruction/command/notice/message/etc. that indicates a volume reservation is requested. In an embodiment, a volume reservation is automatically set for a Volume, when the Volume is created. In such an embodiment, "receiving an indication" may refer to receiving an indication that the Volume has been created. The phrase "receiving an indication" may also refer to receiving an indication to set and/or reset a capacity guarantee for a preexisting Volume. For example, a storage allocation module (e.g., storage allocation module 400, shown in FIG. 3) may receive an instruction/command/ notice/message/etc. from a user interface indicating that a space reservation has been set and/or reset for one or more of Volumes 440/450.

Referring to process block 620, the receipt of an indication to set a space volume reservation involves calculating the amount of space in the associated aggregate that is required by the space reservation and determining whether the required space is available in the aggregate. Storage space is typically allocated and/or reserved in blocks. In one embodiment, the blocks of memory are 4 KB in size. In another embodiment, the size of blocks may be larger, smaller, and/or may vary from block to block.

In an embodiment, each Volume maintains one or more data structures (e.g., counters 490-496) to store values corresponding to how much space within the Volume has been used and how much space is reserved. Similarly, the aggregate maintains one or more data structures to show the sum of all space used within the aggregate and the sum of all space reserved within the aggregate. In one embodiment, these data structures are used to set a space reservation.

In an embodiment, the storage allocation module 400 calculates the amount of free space required based, at least in part, on the data structures associated with the Volume for which the space reservation is being set. In one embodiment, the amount of free space may be calculated based upon a sum across all volumes of the amount of space that is reserved in the aggregate, an amount of space that is used within the aggregate and a total amount of space available in the aggregate.

Referring again to FIG. 5, if the amount of space within the aggregate is insufficient to set the space reservation, process block 640 is performed. Otherwise, at process block 630, the space reservation is set for the volume to reserve a specified amount of the aggregate for the volume according to the space reservation. Otherwise, at process block 640, it is determined whether the volume is enabled for a delayed space reservation.

As described herein, a delayed space reservation refers to a space reservation that is delayed until an amount of free space is reclaimed from the aggregate that is sufficient to enable setting of the space reservation. Accordingly, at process block 650, it is determined whether a sufficient amount of space-reclaimable is available within the aggregate for a delayed space reservation. In one embodiment, space-reclaimable refers to each allocated, unreserved block within the aggregate that is owned by a space-reclaimable volume (see FIG. 7).

As indicated above, reclaiming space is limited to space-reclaimable volumes, such as, for example, caching volumes, since caching volumes are used for temporary storage of client data and therefore may relinquish some of the cached client data without risking loss of the client data. Conversely, non-space-reclaimable volumes are used for persistent storage of client data. Therefore data removed from non-space-reclaimable volumes is lost. Hence, at process block 660, space is reclaimed within the aggregate from one or more space-reclaimable volumes to enable a delayed space reservation for the volume. Finally, at process block 670, the delayed space reservation is set for the volume to reserve a specified amount of the aggregate for the volume using, for example, delayed space reservation module 410 (FIG. 3).

Figure 6:
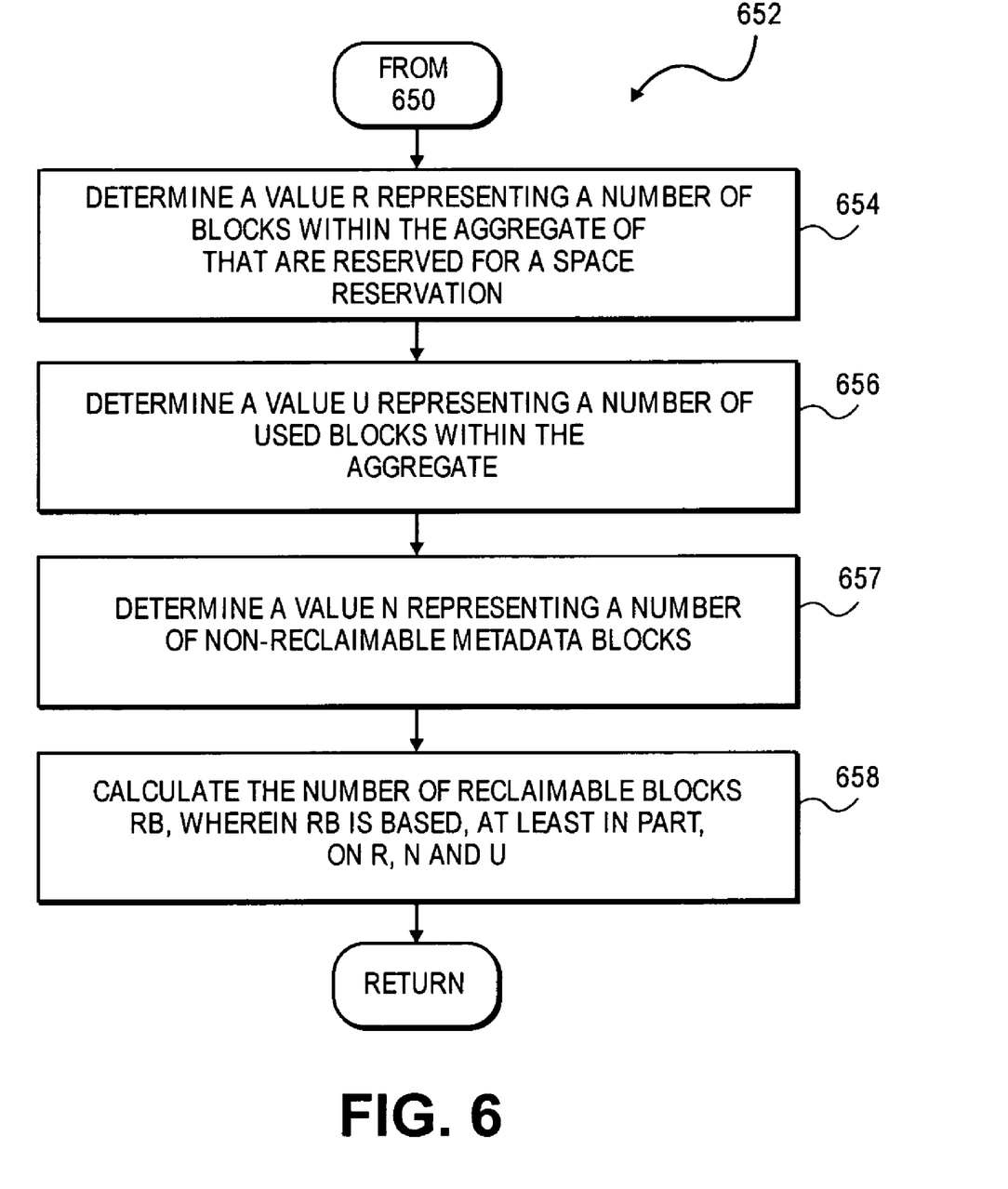
FIG. 6 is a flowchart illustrating a method for determining an amount of space-reclaimable within an aggregate according to an embodiment of the invention.

FIG. 6 is a block diagram illustrating an additional method 652 performed by process block 650, in accordance with one embodiment, to determine an amount of space-reclaimable within an aggregate to enable a delayed space reservation, in accordance with one embodiment. At process block 654, a value R is determined representing a number of blocks within the aggregate that are reserved for a space reservation. At process block 656, a value U is determined representing a number of blocks used by each volume 740/750 (See, FIG. 7) within the aggregate. At process block 657, a value N is determined representing a number of non-reclaimable meta data blocks. In one embodiment, the number of reclaimable blocks (RB) is calculated as follows:

$$RB = U - R - N \quad (1)$$

Accordingly, the number of reclaimable blocks may refer to the number of allocated, unreserved blocks within the aggregate. As described herein, "space-reclaimable" may refer to space within the aggregate utilized by a space-reclaimable volume beyond an amount reserved for the volume. Accordingly, the amount of space-reclaimable within the aggregate summed across all space-reclaimable volumes in combination with the free space available within the aggregate and a number of non-reclaimable metadata blocks may be used to determine whether a delayed space reservation may be set for the Volume.

As illustrated in FIG. 7, Volume 740/750 includes a partial space reservation 760. As described herein, a "partial space reservation" may reserve a limited amount of storage for a space-reclaimable volume. In one embodiment, partial space reservation module 405 (FIG. 3) reserves an amount to ensure that the caching volumes, as well as other volumes, which share the aggregate, are not prohibited from having some minimum amount of storage within the aggregate 780. As indicated above, method 652 may be performed in parallel for each space-reclaimable volume associated with aggregate 780, as directed by delayed space reservation module 410 (FIG. 3). As shown in FIG. 7, counter 762 tracks an amount "R" reserved for Volume 740/750, count 766 track an amount of space "U," used by a Volume and a counter 768 that tracks an amount of non-reclaimable metadata blocks within aggregate 780.

Figure 8:
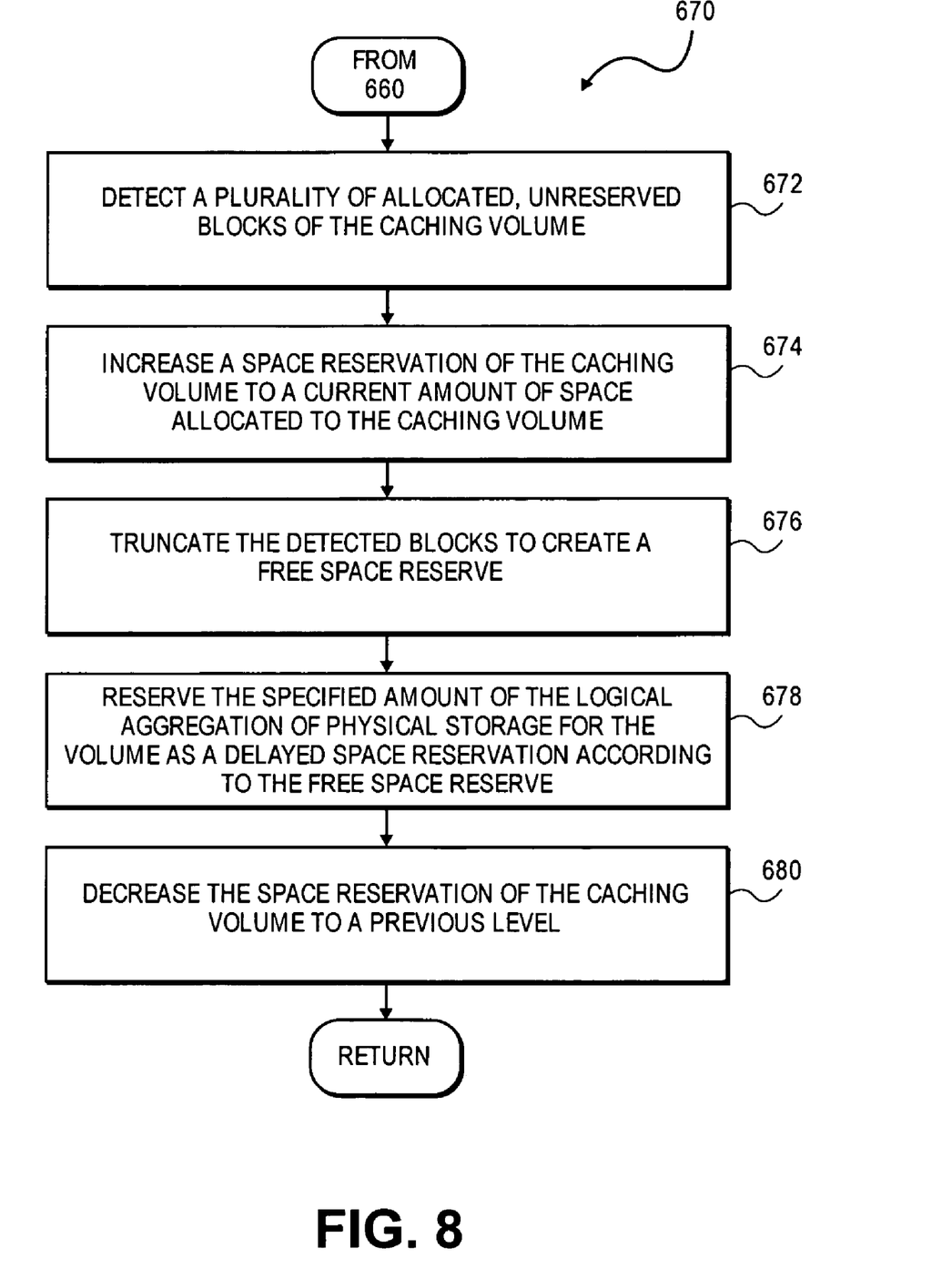
FIG. 8 is a flow diagram illustrating of a method for reclaiming space within an aggregate according to an embodiment of the invention.

FIG. 8 is a flowchart illustrating an additional method 670 performed for process block 660 of FIG. 5 to reclaim space within caching volumes of an aggregate, in accordance with one embodiment, as directed by, for example, aggregate truncation module 430 (FIG. 3). At process block 672, a plurality of allocated, unreserved blocks of each caching volume associated with an aggregate are detected. Once detected, at process block 674, a space reservation of each caching volume, including allocated, unreserved blocks, is increased to reserve the detected blocks. At process block 676, the detected blocks are truncated to create a free space reserve.

Referring again to FIG. 8, once the detected blocks are truncated, at process block 678, the specified amount of the aggregate is reserved for the volume as a delayed space reservation according to the free space reserve created by truncating the detected blocks of process block 676. At process block 680, the space reservation of each caching volume, including allocated, unreserved blocks, is decreased to a previous level. Accordingly, as described herein, the truncating, or freeing, of detected blocks creates additional space within the aggregate.

However, simply truncating detected blocks does not prevent Volumes (excluding the Volume requiring the space reservation) associated with the aggregate ("other Volumes") from claiming those freed blocks. In one embodiment, increasing a space reservation for each space-reclaimable volume having allocated, unreserved blocks creates a free space reserve once the allocated, unreserved blocks are truncated. In one embodiment, blocks within the free space reserve are prohibited from being acquired or allocated by the other Volumes associated with the aggregate. Reclaiming space within the aggregate may also include truncating metadata in favor of client data to provide additional storage capacity within the aggregate. In one embodiment, aggregate truncation module 430 (FIG. 3) performs truncation to reclaim space within the aggregate to enable the setting of a delayed space reservation.

In an alternative embodiment, aggregate truncation module 430 (FIG. 3) may perform random caching volume truncation within the aggregate to reclaim space. In one embodiment, aggregate truncation module 430 (FIG. 3) measures a number of free blocks on a target volume and the associated aggregate. Based on the number of free blocks, aggregate truncation module 430 compares the number of free blocks to a predetermined minimum percentage, a predetermined medium percentage and a predetermined maximum percentage. In one embodiment, if the number of free blocks is below the minimum percentage, aggregate truncation module 430 may randomly select a space-reclaimable volume and begin truncation of data associated with the selected volume. In one embodiment, this process is repeated for one or more caching volumes until a free block count exceeds a maximum predetermined level. In one embodiment, aggregate truncation module 430 performs random inode file block truncation for each selected space-reclaimable volume until a free block count from such truncation reaches or exceeds the maximum predetermined level.

Figure 9:
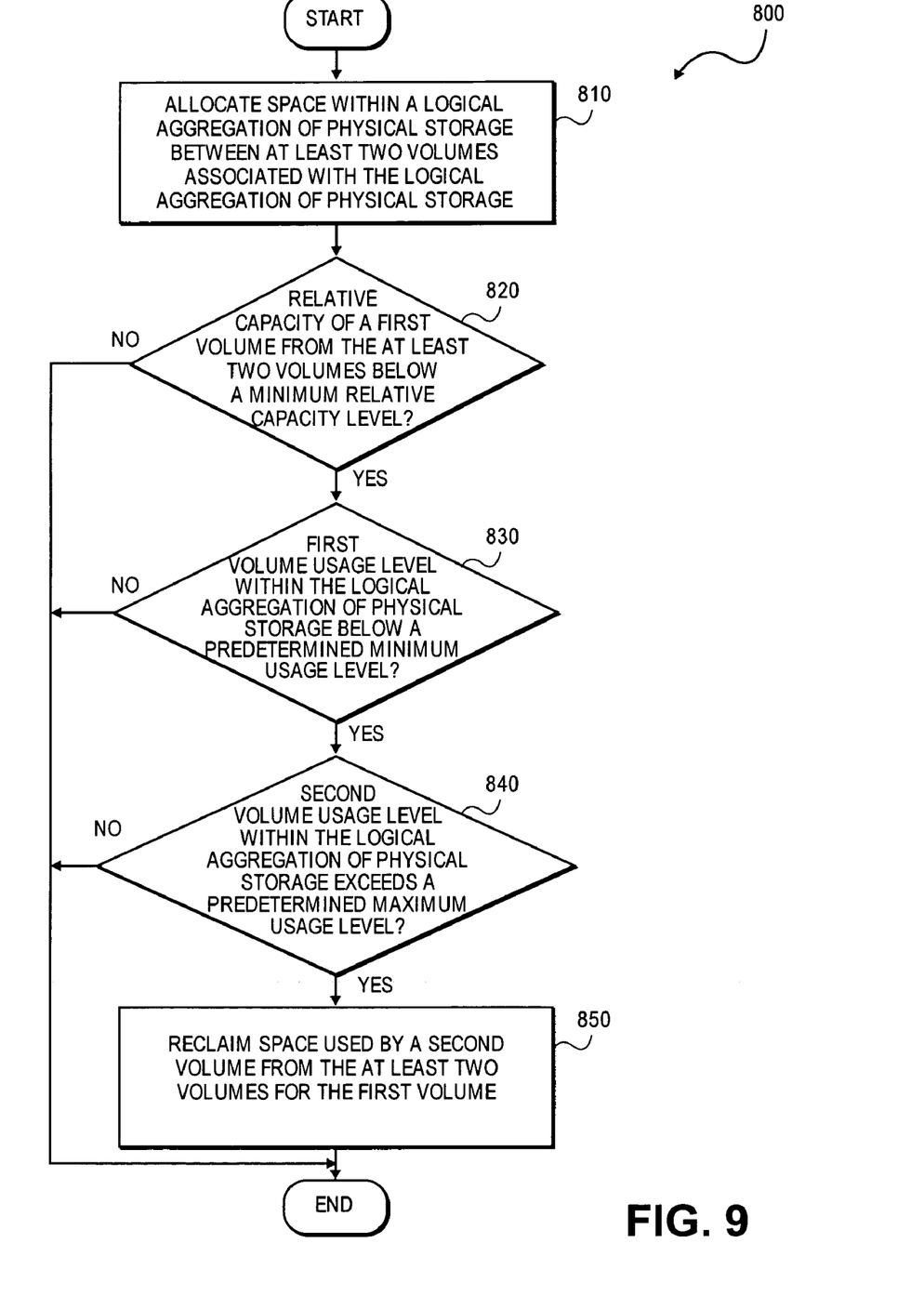
FIG. 9 is a flowchart illustrating a method for allocating and re-allocating space within an aggregate according an embodiment of the invention.

FIG. 9 is a flowchart illustrating a method 800 for allocating space and subsequent rebalancing of the allocation of space within the logical aggregation of physical storage to maintain volumes operating above a minimum relative capacity level. As described herein, "relative capacity" refers to a value representing a maximum amount of data currently available for storage within a Volume according to available space within the logical aggregation of physical storage.

Referring again to FIG. 9, at process block 810, space is allocated within the logical aggregation of physical storage between at least two volumes associated with the logical aggregation of physical storage. In one embodiment, partial space reservation module 405, as shown in FIG. 3, is used to set a partial space reservation for each of the volumes associated with the logical aggregation of physical storage. As described herein, a "partial space reservation" may specify that the logical aggregation of physical storage is to provide a specified amount of reserved space to each volume that is at less than a capacity of each volume. In one embodiment, partial space reservations are set for caching volumes to ensure that the relative capacity of the volumes does not fall below a minimum relative capacity level.

At process block 820, a relative capacity of a first volume from the at least two volumes is detected to determine whether the relative capacity is below a minimum relative capacity level. When such is the case, at process block 830, it is determined whether a first volume usage level within the logical aggregation of physical storage is below a predetermined minimum usage level. As described herein, "usage level" may refer to the amount of data currently stored within the aggregate for a respective Volume. If the first volume usage level is below a predetermined minimum usage level, at process block 840, it is determined whether a second volume from the at least two volumes has a second volume usage level that exceeds a predetermined maximum usage level.

In one embodiment, the indication that a second volume is operating at a maximum usage level, whereas a first volume is operating below a minimum usage level, indicates that the second volume is unfairly hoarding the space available within the aggregate. Accordingly, when such a condition is detected, at process block 850, space is reclaimed from the second volume for the first volume, for example, as illustrated with reference to method 670, as illustrated in FIG. 8. In one embodiment, aggregate rebalance module 420 (FIG. 3) is responsible for detecting such operating conditions and triggering a caching volume operating above a predetermined maximum usage level to truncate the space within the aggregate belonging to the offending volume to provide such space to the volume that is operating below a minimum usage level.

Accordingly, storage allocation module 400, in combination with partial space reservation module 405, delayed space reservation module 410, aggregate rebalance module 420 and aggregate truncate model 430 may ensure that storage is allocated fairly between all caching volumes using heuristics including, but not limited to, client access patterns, disk usage and the like; between non-caching and caching volumes using partial space reservations; and within a single caching volume between cache data and metadata using truncation. In one embodiment, storage allocation module 400 (FIG. 3) ensures that caching volumes and non-caching volumes equally share the same underlying storage pool provided by an aggregate while providing improved cache performance and behavior. In one embodiment, storage allocation module 400 ensures that data stored by non-caching volumes does not adversely impact caching volumes by continually monitoring and adjusting the allocation and usage of an aggregate by the non-caching and caching volumes associated with the aggregate.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, or other type of machine-readable storage media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method comprising:

receiving, at a storage server, an indication to set a space reservation for a volume associated with a logical aggregation of physical storage, wherein the logical aggregation of physical storage provides an abstraction layer between the volume and a physical storage;

reclaiming space from one or more space-reclaimable volumes that organize space within the logical aggregation of physical storage if the logical aggregation of physical storage does not have enough free space to reserve a specified amount of storage space for the volume to provide a requested storage capacity for the volume according to the space reservation, wherein reclaiming space includes determining an amount of space-reclaimable available from the one or more space-reclaimable volumes if the volume accepts a delayed space reservation, and delaying setting of the space reservation for the volume until a sufficient amount of space is reclaimed from the one or more space-reclaimable volumes, wherein the delaying includes detecting a plurality of allocated, unreserved blocks of the one or more space-reclaimable volumes, performing at least one of truncating and compressing data in the detected blocks to create a free space reserve, and reserving the specified amount of the logical aggregation of physical storage for the volume as a delayed space reservation according to the free space reserve; and granting the delayed space reservation for the volume until the sufficient amount of space is reclaimed from the one or more space-reclaimable volumes associated with the logical aggregation of physical storage to provide the requested storage capacity for the volume, wherein the logical aggregation of physical storage provides a common pool of physical storage shared between at least one space-reclaimable volume and at least one non-space-reclaimable volume and the sufficient amount of storage space to provide a requested storage capacity for the volume is reclaimed from the space-reclaimable volume.

2. The method of claim 1, further comprising:

setting the delayed space reservation for the volume to reserve the specified amount of the logical aggregation of physical storage responsive, at least in part, to the reclaiming of space within the logical aggregation of physical storage, wherein the delayed space reservation specifies that the logical aggregation of physical storage is to provide the specified amount of space to the volume.

3. The method of claim 1, wherein receiving the indication to set the space reservation comprises at least one of:

receiving an indication to create the volume; and receiving an indication to set a space reservation for a previously-created volume.

4. The method of claim 1, wherein receiving the indication to set the space reservation further comprises:

determining a value R representing a number of blocks within the logical aggregation of physical storage that are reserved for a space reservation;

determining a value U representing a number of used blocks within the logical aggregation of physical storage;

determining a value N representing a number of non-reclaimable metadata blocks within the logical aggregation of physical storage; and calculating the number of reclaimable blocks RB, wherein RB is based, at least in part, on R, N and U.

5. The method of claim 1, wherein receiving the indication to set the space reservation further comprises:

detecting that the amount of free space within the logical aggregation of physical storage is insufficient to reserve the specified amount if the number of free blocks within the logical aggregation of physical storage is less than the specified amount;

determining an amount of space-reclaimable available from at least one caching volume associated with the logical aggregation of physical storage; and if the amount of space-reclaimable within the caching volume associated with the logical aggregation of physical storage is insufficient to enable the space reservation, initiate the delayed space reservation for the volume.

6. The method of claim 1, wherein the logical aggregation of physical storage is a logical aggregation of one or more redundant array of inexpensive disks (RAID) groups.

7. The method of claim 1, wherein delaying setting of the space reservation further comprises:

increasing a partial space reservation of the one or more space-reclaimable volumes to set a space reservation for the one or more space-reclaimable volumes to provide a requested storage capacity for the one or more space-reclaimable volumes; and decreasing the space reservation of the one or more space-reclaimable volumes to a previous level.

8. An article of manufacture comprising:

a machine-readable storage medium encoded with instructions that, when executed by an apparatus, cause the apparatus to:

detect that an amount of free space within a logical aggregation of physical storage is insufficient to set a space reservation for a volume associated with the logical aggregation of physical storage, wherein the logical aggregation of physical storage provides an abstraction layer between the volume and a physical storage;

determine an amount of space-reclaimable available from one or more space-reclaimable volumes associated with the logical aggregation of physical storage;

if the amount of space-reclaimable within the space-reclaimable volume associated with the logical aggregation of physical storage is insufficient to enable the space reservation, reclaim space from the one or more space-reclaimable volumes associated with the logical aggregation of physical storage, and grant a delayed space reservation for the volume until a sufficient amount of space is reclaimed from the one or more space-reclaimable volumes wherein reclaiming space includes detecting a plurality of allocated, unreserved blocks of the one or more space-reclaimable volumes, performing at least one of truncating and compressing data in the detected blocks to create a free space reserve, and reserving the specified amount of the logical aggregation of physical storage for the volume as a delayed space reservation according to the free space reserve; and grant the space reservation to provide a requested storage capacity for the volume responsive, at least in part, to the delayed space reservation, wherein the logical aggregation of physical storage provides a common pool of physical storage shared between the at least one space-reclaimable volume and at least one non-space-reclaimable volume.

9. The article of manufacture of claim 8, wherein the instructions that, when executed by the apparatus, cause the apparatus to detect that there is an insufficient amount of free space within the logical aggregation of physical storage further cause the apparatus to:

receive an indication to set a space reservation for the volume associated with the logical aggregation of physical storage; and determine whether the amount of free space within the logical aggregation of physical storage is insufficient to reserve the specified amount of the logical aggregation of physical storage for the volume according to the space reservation.

10. The article of manufacture of claim 9, wherein the instructions that, when executed by the apparatus, cause the apparatus to receive the indication to set the space reservation for the volume cause the apparatus to perform at least one of:

receive an indication to create the volume; and receive an indication to set a space reservation for a previously-created volume.

11. The article of manufacture of claim 8, wherein the instructions that, when executed by the apparatus, cause the apparatus to delay setting of the space reservation cause the apparatus to:

detect that the volume is enabled for a delayed space reservation; and reclaim space within the logical aggregation of physical storage to reserve the specified amount of space for the volume according to the space reservation.

12. The article of manufacture of claim 8, wherein the instructions that, when executed by the apparatus, cause the apparatus to determine an amount of space-reclaimable cause the apparatus to:

determine a value R representing a number of blocks within the logical aggregation of physical storage that are reserved for a space reservation;

determine a value U representing a number of used blocks within the logical aggregation of physical storage;

determine a value N representing a number of non-reclaimable metadata blocks within the logical aggregation of physical storage; and calculate the number of reclaimable blocks RB, wherein RB is based, at least in part, on R, N and U.

13. The article of manufacture of claim 11, wherein the instructions that, when executed by the apparatus, cause the apparatus to reclaim space within the logical aggregation of physical storage cause the apparatus to:

increase a partial space reservation of the one or more space-reclaimable volumes to set a space reservation for the one or more space-reclaimable volumes to a current amount of space allocated to the one or more space-reclaimable volumes; and decrease the space reservation of the one or more space-reclaimable volumes to a previous level.

14. A method comprising:

in a storage server, allocating space within a logical aggregation of physical storage between at least two volumes associated with the logical aggregation of physical storage, wherein the logical aggregation of physical storage provides an abstraction layer between the at least two volumes and a physical storage;

setting a partial space reservation for each of the volumes, wherein the partial space reservation specifies that the logical aggregation of physical storage is to provide a specified amount of reserved space to each volume that is less than a capacity of each volume;

detecting that a relative capacity of a first volume from the at least two volumes is below a minimum relative capacity level; and reclaiming space used by a second volume from the at least two volumes for the first volume if a first volume usage level within the logical aggregation of physical storage is below a predetermined minimum usage level and a second volume usage level within the logical aggregation of physical storage exceeds a predetermined maximum usage level, wherein the logical aggregation of physical storage provides a common pool of physical storage shared between at least one space-reclaimable volume and at least one non-space-reclaimable volume and the sufficient amount of storage space to provide a requested storage capacity for the volume is reclaimed from the space-reclaimable volume, and wherein reclaiming space includes,
detecting a plurality of allocated, unreserved blocks of the second volume;
truncating the detected blocks to create a free space reserve for the first volume; allocating the free space reserve to the first volume.

15. The method of claim 14, wherein the relative capacity of the first volume is a value representing a maximum amount of data currently available for storage within the first volume according to available space within the local aggregation of physical storage.

16. The method of claim 14, wherein reclaiming space used by the second volume comprises:
increasing a space reservation of the second volume to a current amount of space allocated to the second volume; and
decreasing the space reservation of the second volume to a previous level.

17. The method of claim 14, wherein the first volume is a non-caching volume and the second volume is a caching volume.

18. An apparatus comprising:
a storage server to maintain a hierarchical structure of data stored in an array of physical storage devices and to service read and write requests from one or more clients relating to data stored in the array of physical storage devices;
one or more non-space-reclaimable volumes, each sharing a common pool of physical storage provided by the array of storage devices, wherein each non-space-reclaimable volume is a logical data container;
one or more space-reclaimable volumes, each sharing the common pool of physical storage provided by the array of storage devices, wherein each space-reclaimable volume is a logical data container for temporary storage of client data and configured to enable the reclaiming of space within the respective space-reclaimable volume;
a logical aggregation of physical storage to provide an abstraction layer between the one or more non-space-reclaimable volumes, the one or more space-reclaimable volumes and the array of storage devices; and
a storage allocation module to monitor and adjust allocation of the logical aggregation of physical storage between the non-space-reclaimable volumes and the space-reclaimable volumes, the storage allocation module including a delayed space reservation module to reclaim space from one or more space-reclaimable volumes associated with the logical aggregation of physical storage if the logical aggregation of physical storage does not have enough free space to reserve a specified amount of storage space for a volume to provide a requested storage capacity for the volume according to a space reservation for the volume, wherein reclaiming space includes
determining an amount of space-reclaimable available from one or more space-reclaimable volumes if the volume accepts a delayed space reservation, and
delaying setting of the space reservation for the volume until a sufficient amount of space is reclaimed from the one or more space-reclaimable volumes, wherein the delaying includes
detecting a plurality of allocated, unreserved blocks of the one or more space-reclaimable volumes,
performing at least one of truncating and compressing data in the detected blocks to create a free space reserve, and
reserving the specified amount of the logical aggregation of physical storage for the volume as a delayed space reservation according to the free space reserve, and
the storage allocation module to further set a delayed space reservation for the volume responsive, at least in part, to reclaiming of space from at least the one or more space-reclaimable volumes to provide the requested storage capacity for the volume,
wherein the logical aggregation of physical storage provides a common pool of physical storage shared between at least one space-reclaimable volume and at least one non-space-reclaimable volume and the sufficient amount of storage space to provide a requested storage capacity for the volume is reclaimed from the space-reclaimable volume, and
wherein reclaiming space includes at least one of: truncating and compressing data contained in the one or more space-reclaimable volumes.

19. The apparatus of claim 18, wherein the storage allocation module further comprises an aggregate rebalancing module to detect that a relative capacity of a first volume is below a minimum relative capacity level and to reclaim space used by a second volume if a first volume usage level within the logical aggregation of physical storage is below a predetermined minimum usage level and a second volume usage level within the logical aggregation of physical storage exceeds a predetermined maximum usage level.

20. The apparatus of claim 19, wherein the first volume is a non-caching volume and the second volume is a caching volume.

* * * * *